(12) United States Patent
Madaiah

(10) Patent No.: US 9,130,833 B2
(45) Date of Patent: Sep. 8, 2015

(54) SYSTEM AND METHOD OF SEGMENT PROTECTION IN A COMMUNICATION NETWORK

(75) Inventor: Vinod Kumar Madaiah, Bangalore (IN)

(73) Assignee: Tejas Networks Limited, Bangalore (IN)

( * ) Notice: Subject to any disclaimer, the term of this patent is extended or adjusted under 35 U.S.C. 154(b) by 153 days.

(21) Appl. No.: 13/261,743

(22) PCT Filed: Aug. 11, 2011

(86) PCT No.: PCT/IN2011/000534
§ 371 (c)(1),
(2), (4) Date: Sep. 23, 2013

(87) PCT Pub. No.: WO2012/127489
PCT Pub. Date: Sep. 27, 2012

(65) Prior Publication Data
US 2014/0040439 A1 Feb. 6, 2014

(30) Foreign Application Priority Data
Mar. 22, 2011 (IN) .............................. 893/CHE/2011

(51) Int. Cl.
*G06F 15/177* (2006.01)
*H04L 12/26* (2006.01)
*H04J 3/07* (2006.01)
*H04L 12/24* (2006.01)
*H04L 12/18* (2006.01)

(52) U.S. Cl.
CPC ............ *H04L 41/0803* (2013.01); *H04L 12/18* (2013.01); *H04L 43/0811* (2013.01); *H04L 43/10* (2013.01)

(58) Field of Classification Search
USPC ........................................... 370/248; 709/220
See application file for complete search history.

(56) References Cited

U.S. PATENT DOCUMENTS

| 2005/0018612 A1* | 1/2005 | Fitzgerald | 370/248 |
| 2007/0259662 A1* | 11/2007 | Lee et al. | 455/433 |
| 2008/0072251 A1* | 3/2008 | Namvar | 725/36 |
| 2010/0046600 A1* | 2/2010 | Zerbe et al. | 375/233 |

* cited by examiner

*Primary Examiner* — Emmanuel L Moise
*Assistant Examiner* — Mahran Abu Roumi
(74) *Attorney, Agent, or Firm* — Woodard, Emhardt, Moriarty, McNett & Henry LLP

(57) ABSTRACT

Embodiments of the present invention described herein, discloses a method and a system for segment protection system in an Ethernet communication network. In one embodiment herein, a 'periodic integrity check' message frame being created at the source-node and is multicasted to the destination-node directly and via the peer node(s) within a segment protection domain. A Σ1 receiver is configured at the destination-node for receiving the multicasted message frames. The Σ1 receiver 'selects' only single message frame from the multicasted message frames being received at all maintenance points, for maintaining at least one fault-less path between the source-node and the destination-node.

15 Claims, 3 Drawing Sheets

US 9,130,833 B2

SYSTEM AND METHOD OF SEGMENT PROTECTION IN A COMMUNICATION NETWORK

FIELD OF THE INVENTION

The present invention relates to protection switching and more particularly to segment protection in an Ethernet communication network.

BACKGROUND

In a typical computer network, the network peers send and receive data packets. Each packet of data follows a particular path from source peer to the destination peer. A fault in a segment or failure of path will disturb the data traffic. A segment generally consists of plurality of nodes linearly connected with links. A typical example of a segment would be a link connecting two nodes or an entire end-to-end service path.

Presently, local segment based protection switching is done when the segment is under fault connection. To monitor the connectivity fault of end-to-end service there are a standard based mechanism: IEEE 802.1ag (CFM OAM), IEE802.3ah (EFM OAM), ITU-T Y.1731 (ETHOAM), ITU-T G.8031 (ELPS) and ITU-T G.8032 (ERPS). Essentially it involves exchanging of periodic frames between end nodes of service or segment. Despite there being many standards for connectivity monitoring, there are cases where a service could be working but segment could be reported to be in fault due to forwarding database error or mis-configuration within a segment. There are also cases where forwarding database of service is faulty or a service is misconfigured within the segment even while the segment is in order. The above mentioned problem may be overcome by a method using a unicast CCM (periodic integrity check message), where unicast CCM was provisioned between the end-points of an Infrastructure Segment to monitor the connectivity of the same. The method using a unicast CCM do not solve the issues of reduced bandwidth utilization within the infrastructure segment protection domain per service, coordination needed between inner infrastructure segment protection domain and outer infrastructure segment protection domain, and more numbers of frame processing per service within nested infrastructure segment protection domain.

Therefore, there is a need in the art for a method and system for segment protection domain in an Ethernet communication network to overcome the above restrictions and limitations.

Before describing the novel solution in detail, it would be important to first understand the following terminologies.

Segment Protection Domain—It basically consists of multiple infrastructure segments between the end points such that if one infrastructure segment fails then other infrastructure segment will protect the traffic flowing over failed infrastructure segment.

Infrastructure Segment—It is the linear chain of nodes and links. Two or more infrastructure segment form one infrastructure segment protection domain or segment protection domain

SUMMARY

An object of this invention is to provide minimum bandwidth utilization within the infrastructure segment protection domain per service.

Another object is to provide coordination needed between inner infrastructure segment protection domain and outer infrastructure segment protection domain.

Yet another object of the present invention is to reduce the number of frame processing per service within nested infrastructure segment protection domain.

In accordance with this there is provided a method and a system for segment protection protection domain in an Ethernet communication network.

In one embodiment of the present invention at least one segment is configured that comprises a source-node, a destination-node, and at least one peer node, each node having multiple ports. A 'periodic integrity check' message frame may be created at the source-node and may be multicasted to the destination-node directly and via the peer node(s). Only one copy of frame is being forwarded per port of the concerned nodes within the segment wherein all message frames being multicasted have same identifiers including IEEE VLAN. A Σ1 receiver may be configured at the destination-node for receiving multicasted message frames.

Further, a plurality of maintenance point may be configured on ingress port of the destination-node, each receiving one message frame to be delivered to the destination node.

The Σ1 receiver 'selects' only single message frame from the multicasted message frames being received at all maintenance points, and thereby maintaining at least one fault-less path between the source-node and the destination-node.

In one embodiment herein, the segment protection domain is a nested infrastructure segment protection domain comprising the segment protection domain and an inner segment protection domain, said segment protection domain being configured as an outer segment protection domain and the inner segment protection domain comprising a forwarding-node, a transit-node, and at least one inner peer-node, each node having multiple ports.

In one embodiment herein, a sequence number is provided in multicast message frame for enabling.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures.

DESCRIPTION OF THE INVENTION

The present invention described herein, discloses a method and a system for segment protection system in an Ethernet communication network. In one embodiment herein, a 'periodic integrity check' message frame being created at maintenance point of the source-node is multicasted to the destination-node directly and via the peer node(s) within a segment protection domain. A Σ1 receiver is configured at the destination-node for receiving the multicasted message frames. The Σ1 receiver 'selects' only single message frame from the multicasted message frames being received at all maintenance points, for maintaining at least one fault-less path between the source-node and the destination-node.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems. The best mode of the invention described in the specification illustrates the exemplary embodiment of the invention. It is understood that one skilled in art may modify or change the modules used in the best mode of invention.

Reference in the specification to "one embodiment" or "an embodiment" means that a particular feature, characteristic, or function described in connection with the embodiment is included in at least one embodiment of the invention. The appearances of the phrase "in one embodiment" in various places in the specification are not necessarily all referring to the same embodiment.

Figure 1:
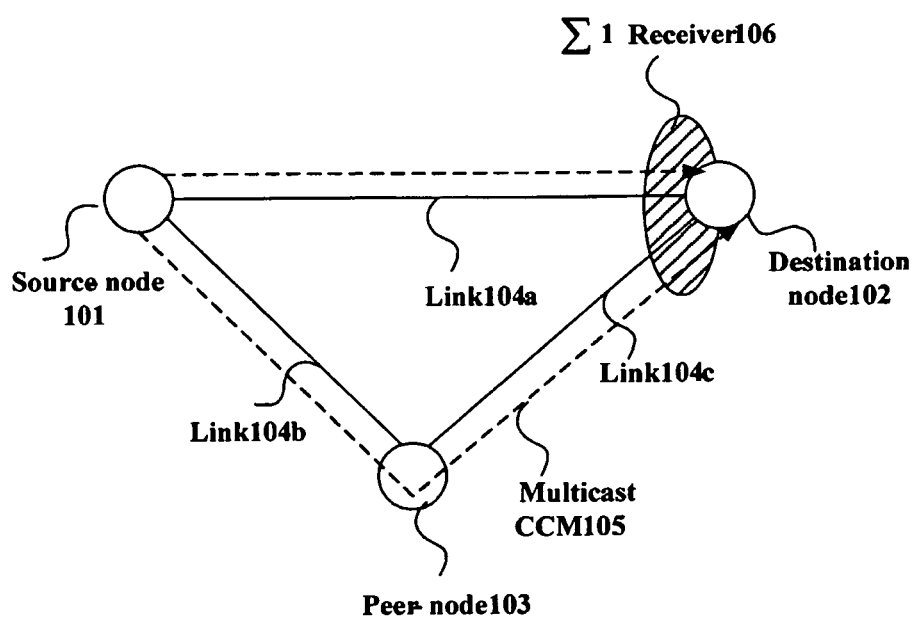
FIG. 1 is a basic structure of multicasting in a segment protection domain having a Σ1 receiver according to the present invention to restore the fault links.

FIG. 1 is a basic structure of multicasting in a segment protection domain having a Σ1 receiver according to the present invention. In one embodiment herein, and as shown in the figure, the segment protection domain (SPD) comprises a source node 101, a destination-node 102 and a peer-node 103. Each node connected to each other via a link 104. The source node 101 and destination-node 102 are connected to each other through a link 104a. Link 104b connects the source node 101 and peer-node 103. Link 104c connects peer-node 103 and the destination-node 102. The source node 101 creates one periodic integrity check message frame (for example a CCM Frame). Said message frame has multicast destination address which may be then multicasted towards the destination-node 102 directly and via the peer-node(s) within the SPD. All message frames being multicasted have same identifiers such as IEEE VLAN, IETF MPLS Label, etc.

Since the frame is multicasted 105, i.e. a CCM frame with multi-cast destination address of the destination-node 102, and also because both ports of source-node 101 are member on which the multi-cast CCM are to be forwarded, two copies of the same frame leave the source-node 101. The effort to create two copies is much less than creating two different frames. This is the principle behind a multi-cast capable device or switch as per the present invention.

Further, a Σ1 receiver 106 is configured at the destination-node 103 for receiving the multicasted message frames. Said receiver in this example may be called a 1+1 CCM receiver 106 as it is receiving two Multicast CCMs 105.

Furthermore, two maintenance ports (MEPs) (not shown) are also configured on the ingress of the destination-node 103. Each MEP will receive one single multicast CCMs. Reception of CCM on two MEPs indicates fault-less link towards the destination-node 103. There may be more number of MEPs also and based on that, the number of multicast CCM may be more. In other words, the number of frames multicasted depends on number of ports that are member of the maintenance association (MEPs' association).

The 1+1 CCM receiver 106 will 'select' only single copy from the multiple Multicast CCM received from two of its ports. The number of packets forwarded or multicasted depends on number of ports that are member of the multicast CCM. To accomplish the task of selecting a single and exact copy, a unique sequence number in multicast CCM frame is introduced according to the present invention. The 1+1 CCM receiver 106 waits until the expected sequence number arrives and discards all previously arrived sequence number. The 1+1 CCM receiver 106 may also be given another more general name, 'the Redundant CCM Processor' (RCP) 106 when there are more than one ingress ports.

Figure 2:
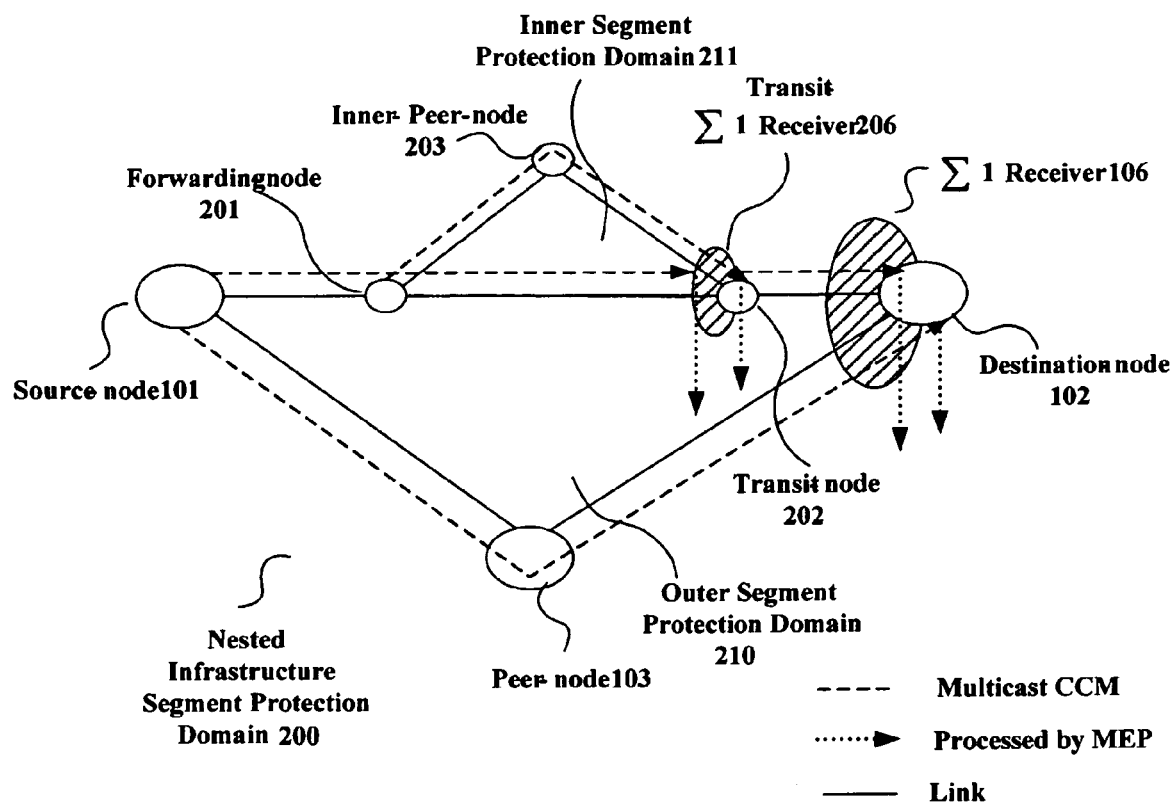
FIG. 2 illustrates multicasting in one direction according to the present invention.

FIG. 2 illustrates multicasting in one direction according to the present invention. The segment protection domain shown in the figure is a nested infrastructure segment protection domain 200 comprising an outer segment protection domain (OSPD) 210 similar to the segment protection domain discussed in FIG. 1 and an inner segment protection domain (ISPD) 211. The ISPD 211 comprises a forwarding-node 201, a transit-node 202, and at least one inner peer-node 203, each node having multiple ports. The forwarding-node 201 just passes the message frame to its neighbouring node 202 or 203 and need not create a new periodic integrity check message frame.

Further, the forwarding node 201 forwards the message frame to the destination-node 102 directly and via the inner peer node(s) 203. As per the present invention, the transit-node 202 is also provided with another configured Σ1 receiver 206, and is called a transit-Σ1 receiver (or the transit RCP) 206.

In the nested infrastructure segment protection domain 200, the destination-node 102 of the OSPD 210 is the terminal node 102 that receives at least two copies of multicasted 'periodic integrity check' message frame and does not forward the same to any other node. The transit node 202 receives at least two copies of multicasted 'periodic integrity check' message frame and forwards at least one copy of it to the destination-node 102.

The received periodic integrity check message frame (e.g. CCMs) are processed by MEPs. The transit RCP 206 will have two MEPs to process the two received multicast CCM.

When both MEPs receive the CCM then it indicates that there is no fault. Further, instead of two MEPs, one or more of the two MEPs may be replaced by an MIP (maintenance intermediate point).

The MIP when receives a multicast CCM, it will notify that no fault is found on the link. Frames from MIP and MEP will enter a transit RCP wherein exactly one multicast CCM is forwarded towards terminal RCP (Σ1 receiver of the destination-node) based on the sequence number carried by the multicast CCM. The terminal RCP also works similar to Transit RCP.

Figure 3:
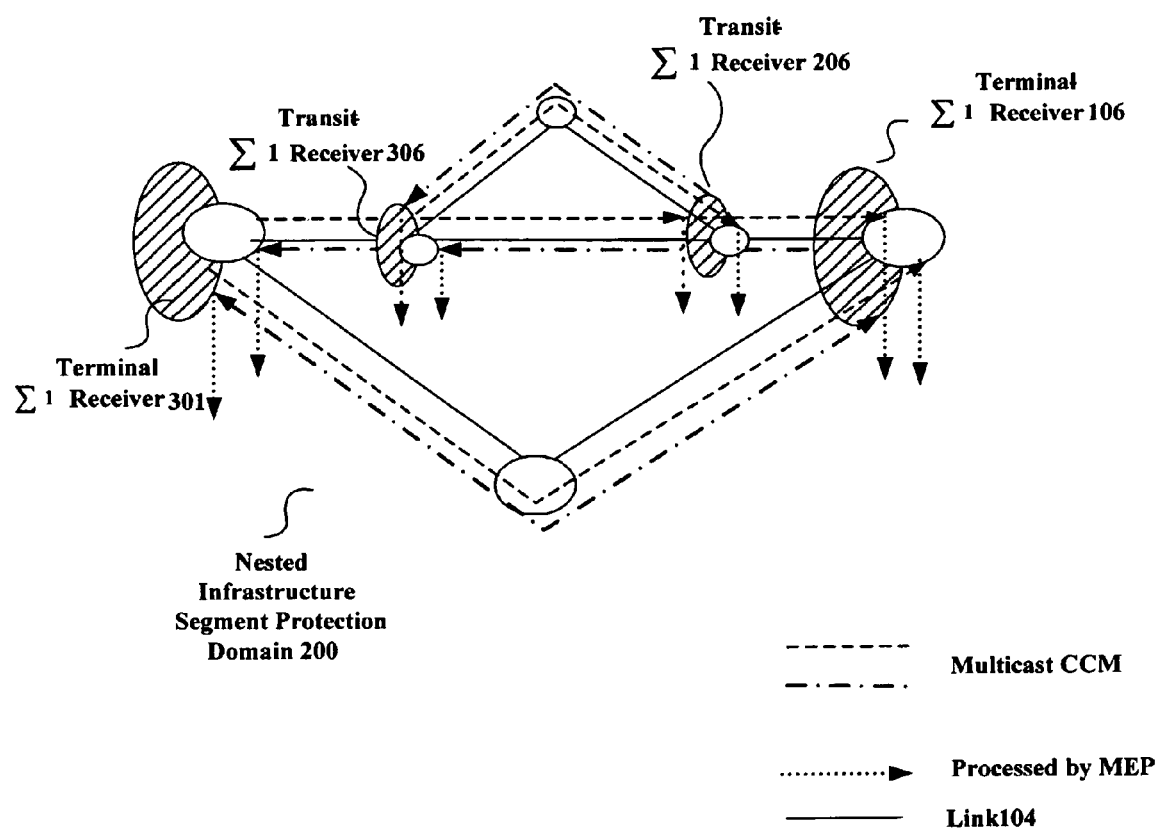
FIG. 3 illustrates two-way multicasting according to the present invention.

FIG. 3 is an illustration of two-way multicasting according to the present invention. The multicast periodic integrity check message frames (e.g. CCMs) are congruent, meaning they travel the same nodes and links in both directions: left-to-right and right-to-left, i.e. source to destination-node and destination to source-node. Bi-directional congruent multicast CCM is needed to monitor Infrastructure Segment Protection Domain.

Both source-node and the destination node of the outer segment protection domain act as the terminal nodes having a terminal Σ1 receiver 301 for enabling bi-directional congruent multicast CCM. The forwarding-node acts as transit-node and has a transit Σ1 receiver 306 that works in a similar way as explained above for one-way Multicasting. The terminal and transit Σ1 receivers 301 and 306 respectively will have a plurality of MEPs to process the bidirectional multicasting.

Thus, as explained above in the description if FIG. 2, segment protection take places in the similar fashion.

In one embodiment herein there is provided a system for a segment protection system in an Ethernet communication network. The system comprises at least one segment protection domain comprising a source-node, a destination-node, and at least one peer node. Each node may have multiple ports. A 'periodic integrity check' message frame may be created at the source-node and may be multicasted to the destination-node directly and via the peer node(s). A Σ1 receiver may be configured at the destination-node for receiving the multicasted message frames. A plurality of maintenance point may be configured on the destination-node, each receiving one message frame to be delivered to the destination node. Wherein the Σ1 receiver 'selects' only single message frame from the multicasted message frames being received at all maintenance points, for maintaining at least one fault-less path between the source-node and the destination-node.

Advantages

1) A form of coordination for nested ISP is built-in in multicast CCM.
2) A form of coordination called 'Timers of different WTR_while' is not needed for nested ISP in case of multicast CCM.
3) Increased bandwidth utilization within the Infrastructure Segments per service as there is created only one CCM message frame and its multiple copies are delivered via multiple ports of the member nodes towards the destination.
4) Reduced frame processing per service within the Infrastructure Segment Protection Domain as only one frame is created at the source-node and the other peer nodes only forward it to the next node.
5) Low packet processing.

The foregoing description of the invention has been described for purposes of clarity and understanding. It is not intended to limit the invention to the precise form disclosed. Various modifications may be possible within the scope and equivalence of the appended claims.

I claim:

1. A method of segment protection in a communication network, the method comprising the steps of:
    configuring at least one segment protection domain within the network, the segment protection domain (SPD) comprising a source-node, a destination-node, and at least one peer node, each node having multiple ports;
    creating a periodic integrity check message frame at the maintenance point on the source-node;
    multicasting said message frame to the destination-node directly and via the peer node(s);
    configuring a Σ1 receiver at the destination-node for receiving multicasted message frames;
    configuring a plurality of maintenance point on the destination-node, each receiving one message frame to be delivered to the destination node; and
enabling the Σ1 receiver to select only single message frame from the multicast message frames being received at all maintenance points, and thereby maintaining at least one fault-less path between the source-node and the destination-node.

2. The method as in claim 1, wherein the segment protection domain is a nested infrastructure segment protection domain comprising the segment protection domain and an inner segment protection domain, said segment protection domain being configured as an outer segment protection domain and the inner segment protection domain comprising a forwarding-node, a transit-node, and at least one inner peer-node, each node having multiple ports.

3. The method as in claim 2, wherein the forwarding node forwards the message frame to the destination-node directly and via the inner peer node(s).

4. The method as in claim 2, wherein the transit-node is also provided with another configured Σ1 receiver, a transit-Σ1 receiver, and wherein the transit node receives at least two copies of multicast periodic integrity check message frame and forwards at least one copy of it to the destination-node.

5. The method as in claim 2, wherein the destination-node of the outer segment protection domain is the terminal node that receives at least two copies of multicast periodic integrity check message frame and does not forward the same to any other node.

6. The method as in claim 1, wherein the Σ1 receiver waits for the expected message frame arrives and discards all previously arrived message frames.

7. The method as in claim 1, wherein the number of frames multicast depends on number of ports that are member of the maintenance association, and wherein all message frames being multicast have same identifiers including IEEE VLAN, IETF MPLS Label, etc.

8. The method as in claim 1, wherein a sequence number is provided in multicast message frame for enabling the Σ1 receiver to select the exact message frame.

9. The method as in claim 1, wherein the Σ1 receiver is a redundant periodic integrity check message frame processor.

10. The method as in claim 1, wherein only one copy of frame is being forwarded per port of the concerned nodes within the segment protection domain.

11. A segment protection system in an Ethernet communication network, the system comprising:
    at least one Ethernet communication network;
    at least one segment protection domain in the Ethernet communication network comprising a source-node, a destination-node, and at least one peer node, each node having multiple ports, wherein a periodic integrity check message frame being created at the source-node and being multicast to the destination-node directly and via the peer node(s);
    a Σ1 receiver configured at the destination-node for receiving multicast message frames; and
    a plurality of maintenance point configured on the destination-node, each receiving one message frame to be delivered to the destination node,
wherein the Σ1 receiver selects only single message frame from the multicast message frames being received at all maintenance points, for maintaining at least one fault-less path between the source-node and the destination-node.

12. The system as in claim 11, wherein the segment protection domain is a nested infrastructure segment protection domain comprising the segment and an inner segment protection domain, the segment protection domain being configured as an outer segment protection domain and the inner segment protection domain comprising a forwarding-node, a transit-node, and at least one inner peer-node, each node having multiple ports.

13. The system as in claim 12, wherein the forwarding node forwards the message frame to the destination-node directly and via the inner peer node(s).

14. The system as in claim 12, wherein the transit-node is also provided with another configured Σ1 receiver, a transit-Σ1 receiver, and wherein the transit node receives at least two copies of multicast periodic integrity check message frame and forwards at least one copy of it to the destination-node.

15. The system as in claim 12, wherein the Σ1 receiver is a redundant periodic integrity check message frame processor.

* * * * *